April 15, 1930.   H. C. ELLENBERGER   1,754,310
WATER HYDRANT
Filed Feb. 11, 1929
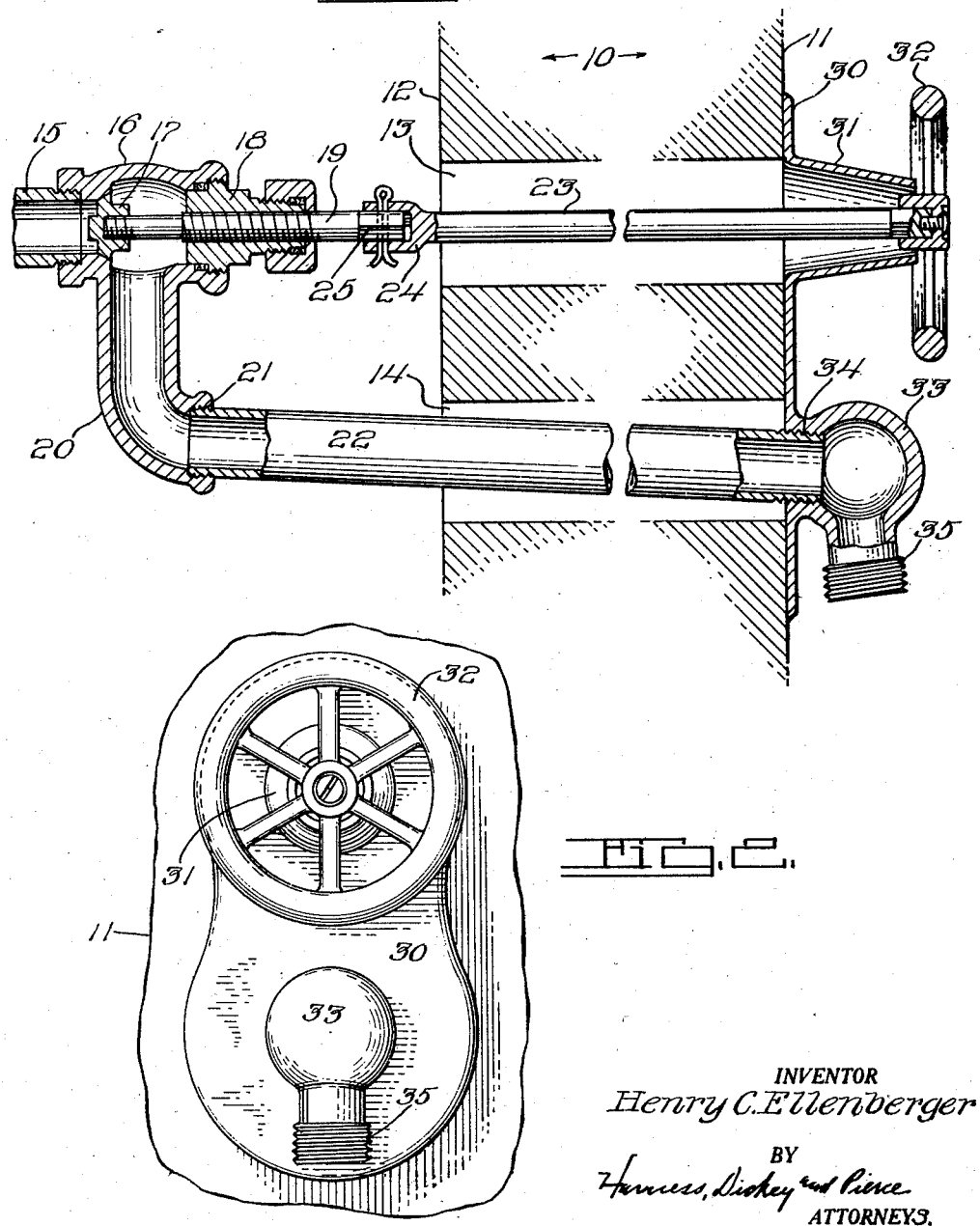
INVENTOR
Henry C. Ellenberger
BY
Harness, Dickey and Pierce
ATTORNEYS.

Patented Apr. 15, 1930

1,754,310

UNITED STATES PATENT OFFICE

HENRY C. ELLENBERGER, OF DETROIT, MICHIGAN

WATER HYDRANT

Application filed February 11, 1929. Serial No. 338,995.

One object of my invention is to provide a water hydrant for use in connection with building walls, and the like, including means for taking water from a supply line interior of the wall to the exterior thereof, and means operable from the outside of the wall to shut off the flow of water at a point on the interior side of the wall.

Another object of my invention is to provide a device in which the means for operating the shut-off means, and the conduit which extends through the wall, may be disconnected relative to the supply line at the interior side of the wall without disturbing the shut-off means in its relation to the supply line.

With these and other objects in view, my invention consists in the arrangement, combination and construction of the various parts of my improved device as described in the specification, claimed in my claim, and shown in the accompanying drawings, in which:

Fig. 1 is a vertical section through a wall showing my device partly in section connecting with a water supply line and assembled relative to the wall.

Fig. 2 is a front elevation of those parts of my device appearing on the exterior face of the wall.

The numeral 10 indicates a building wall. 11 is the exterior face thereof and 12 the interior face. Adjacent apertures 13 and 14 are provided in the wall. 15 is the end of a water supply line to which is connected a T fitting 16 having one end of the T in communication with the water supply line 15 in which end is positioned a valve 17, and having the plug 18 in the other end of the T which forms a bearing for a valve stem 19. A stem 20 of the T extends downwardly and is connected threadably at 21 to the end of the pipe 22 which extends through the aperture 14 in the wall 10. Secured to the valve stem 19 adjacent the interior face 12 of the wall is a secondary valve stem 23 which extends through the aperture 13 in the wall beyond the exterior face 11. This secondary valve stem 23 has a socket wrench 24 formed on its inner end which fits over and is keyed to a squared end 25 of the valve stem 19. On the exterior face 11 of the wall is positioned a bib member 30 having a nipple 31 formed in its upper portion opposite the aperture 13 which provides a bearing at its outer end for the hub of the hand wheel 32 which is attached to the exterior end of the secondary valve stem 23. The lower portion of the bib member 30 is provided with a nozzle attachment 33 which is positioned opposite the wall aperture 14 and which has a threaded neck 34 in which the threaded outer end of the pipe 22 may be turned. The outlet portion of the nozzle attachment 33 is threaded as at 35 to provide means for attaching a hose.

It is thus apparent that the flow of water from the supply line 15 which is positioned on the interior side of the wall 10 may be controlled from the outside thereof so that the water is shut off on the interior side of the wall where there is no danger of freezing, and the pipe 22 being positioned below the valve 17 permits all water which has passed the valve to drain away.

My device may be readily assembled and disassembled. If it is desired to remove the connections which extend through the building wall, the socket wrench portion 24 of the secondary valve stem 23 may be readily disconnected from the main valve stem 19 inside the wall and the pipe 22 may be very readily disconnected from the portion 20 of the fitting 16 at 21. This may be done without making it necessary to shut off the water supply to the line 15 as the valve 17 need not be disturbed, and also permits the use of the fitting 16 as a hydrant on the interior side of the wall, and a hose or other conduit may be readily connected to the fitting member 20 after the pipe 22 has been disconnected, and the valve, after the disconnection of the secondary stem 23, may be conveniently operated on the interior side of the wall.

Formal changes may be made in the specific embodiment of the invention described without departing from the spirit or substance of the broad invention, the scope of which is commensurate with the appended claims.

What I claim is:

1. A device of the class described comprising a fitting, a valve in said fitting, means for operating said valve adapted to extend through a wall, a conduit disassociated from said valve operating means, releasably connected to the discharge port of said fitting and adapted to extend through a wall, said valve operating means having a disconnectable joint adjacent said fitting.

2. A device of the class described comprising a fitting, a valve in said fitting, means for operating said valve adapted to extend through a wall and having a releasable joint adjacent said fitting, a conduit, disassociated from said valve operating means but co-extensive therewith, releasably connected to the discharge port of said fitting, and a bib member including a supporting bearing for said valve operating means and a nozzle attachment for said conduit secured to the outer end thereof.

3. In combination with a building wall and a water supply line positioned interior of said wall, a fitting connected to said water supply line having a valve therein and an escape lead from said valve, a pipe extending from said escape lead to the exterior of said wall, means for operating said valve extending to the exterior of said wall and having a disconnectable joint between said valve fitting and the interior of said wall.

4. In combination with a building wall and a water supply line positioned at the interior side of said wall, a fitting connected to said water supply line, a valve in said fitting, a discharge pipe leading from said fitting to the exterior of said wall, means for operating said valve extending to the exterior of said wall and disassociated from said pipe and having an accessible disconnectable joint positioned between said fitting and the interior face of said wall.

5. In combination with a building wall and a water supply line positioned at the interior side of said wall, a fitting connected to said water supply line, a valve in said fitting, a discharge pipe leading from said fitting to the exterior of said wall, means for operating said valve extending to the exterior of said wall and disassociated from said pipe and having an accessible disconnectable joint positioned between said fitting and the interior face of said wall, and a bib member adapted to fit against the exterior face of said wall and including a supporting bearing for said valve operating means and a nozzle attachment for said pipe.

HENRY C. ELLENBERGER.